United States Patent [19]

Dhyanchand et al.

[11] 4,044,296

[45] Aug. 23, 1977

[54] ELECTRONIC VOLTAGE REGULATOR FOR THREE-PHASE GENERATORS

[75] Inventors: P. John J. Dhyanchand; Timothy F. Glennon; Roland W. Christen, all of Rockford, Ill.

[73] Assignee: Sundstrand Corporation, Rockford, Ill.

[21] Appl. No.: 649,006

[22] Filed: Jan. 14, 1976

[51] Int. Cl.$^2$ .............................................. H02P 9/30
[52] U.S. Cl. ....................................... 322/25; 322/20; 322/27; 322/73; 307/84
[58] Field of Search ............... 322/19, 25, 27, 28, 322/77, 59, 60, 72, 73, 20; 307/84

[56] References Cited

U.S. PATENT DOCUMENTS

| | | | |
|---|---|---|---|
| 3,474,323 | 10/1969 | Kilgore et al. | 322/28 X |
| 3,652,920 | 3/1972 | South et al. | 322/25 X |
| 3,758,843 | 9/1973 | Ishizaki et al. | 322/25 |
| 3,996,507 | 12/1976 | Chambers | 322/20 |

Primary Examiner—Robert J. Hickey
Attorney, Agent, or Firm—Ted E. Killingsworth; William R. Peoples; Michael B. McMurry

[57] ABSTRACT

An electronic circuit is provided for regulating a three-phase generator which includes: a circuit for sensing the average of the three-phase voltages; a circuit for sensing the highest phase voltage; and a circuit for sensing the highest phase current. The output of each of these circuits is compared to reference currents which represent an average voltage setting and high phase voltage and current limits, and an error signal is generated that is integrated over time. The integrated error signal is utilized as input to a comparator circuit which generates a pulsewidth modulated signal that represents deviation from the desired operating parameters. The pulsewidth modulated signal is applied to an output amplifier circuit which in turn serves to control the current through the generator's exciter field. An exciter field current detector is connected between the output amplifier and the input of a gain and compensation circuit in order to provide a negative current feedback circuit to minimize transients. In addition, connections to both the input of the integrator and the input of the gain and compensation circuit are provided so that reactive load division with other generators may be facilitated.

25 Claims, 9 Drawing Figures

ELECTRONIC VOLTAGE REGULATOR FOR THREE-PHASE GENERATORS

BACKGROUND OF THE INVENTION

The invention relates generally to generator voltage regulators and more specifically, to electronic circuits for regulating the voltage and limiting the current output of three-phase generators.

In many practical applications, including aircraft generators, it is considered highly desirable to provide for essentially zero-error steady state voltage control while at the same time being able to limit fault currents when the generator output voltage goes very low and the current output is very high for a short period until the fault is cleared or the generator control relay trips off. In addition, a voltage regulator should also provide critical damping of voltage transients during load application and removal with a minimum of power dissipation.

SUMMARY OF THE INVENTION

It is therefore an object of the invention to provide an electronic voltage regulator that includes circuits for sensing the average voltage output, the high phase voltage, and the highest output current of each phase, along with providing exciter current feedback to control the voltage and limit current output of the generator.

It is a further object of the invention to provide an electronic voltage regulator circuit which utilizes circuits for sensing the average of the phase voltages, the highest phase voltage, and the highest phase current, along with an integrator circuit for integrating an error signal over time from the sensing circuits and a comparator circuit which is responsive to both an integrator and a triangular wave generator for controlling an output amplifier circuit and ultimately, the exciter field current.

It is an additional object of the invention to provide circuits employing operational amplifiers for sensing the average voltage output of the generator, the highest phase voltage for high phase voltage limiting, and the highest phase current for high phase current limiting as compared to reference values, provided from a reference voltage source, for generating an error signal which in turn is integrated over time and utilized by a comparator circuit to generate a pulsewidth modulated signal for controlling an output amplifier and thus the generator exciter field, wherein an exciter field current detector is utilized to provide a negative current feedback signal to minimize transients during load application and removal.

It is still a further object of the invention to provide an electronic voltage regulator for a three-phase generator which senses the average phase voltage, the high phase voltage, and the high phase current for generating an error signal along with providing a circuit for generating negative current feedback signal from the generator's exciter field in order to control the voltage and current output of the generator wherein provision is additionally made for voltage inputs to the voltage regulator from other generators to provide for reactive load control.

Included in the electronic voltage regulator are three circuits for measuring the output of a three-phase generator. These circuits include a circuit for measuring the average voltage output of the three phases, a circuit for measuring the highest voltage output of any one phase, and a circuit for measuring the highest current output of any phase of the generator. Currents from these circuits representing the average phase voltage, the highest phase voltage and the highest phase current are compared to currents representing a nominal value for the average voltage, a high phase voltage limit and a high phase current limit. The currents representing these values are provided by a voltage reference source and associated circuitry. Responsive to the comparison of the currents representing the sensed voltages and current and the currents representing the nominal values and limits, an operational amplifier is provided to generate a voltage which represents the deviation of the average voltage from the nominal value or the amount the phase voltages or currents exceed the limits. The voltage from the operational amplifier representing the deviation or error from the nominal values is applied to an integrating circuit which in turn integrates the error signal over time. Another operational amplifier circuit connected to the output of the integrator provides the desired gain ad compensation to the integrated error signal.

A comparator circuit receives the output from the gain and compensation circuit and compares it to a signal received from a triangular wave generator. The output of the comparator is a pulsewidth modulated square wave wherein the error from nominal values is represented by the width of the pulse. The pulsewidth modulated signal is applied through an optical coupler to an exciter field amplifier circuit. This amplifier circuit is a switching current amplifier which applies the waveform to the exciter field to establish the exciter field current. Thus, the average value of the exciter field current is a function of the pulsewidth modulated signal.

In addition, the voltage regulator includes a negative feedback circuit connected between the exciter field amplifier and the gain and compensation circuit. The feedback circuit provides a voltage which represents the exciter field current to the gain and compensation circuit that serves to reduce transients during shock load removals.

Reactive load division for multi-generator systems is also facilitated by the provision for inputs from other generators, representing the reactive load division error, at the inputs to the integrator circuit and the gain and compensation circuit.

As a result, by sensing the average of the three-phase voltage output of the generator, sensing the high phase voltage and sensing the high phase current, essentially zero error steady state voltage control and limits on the phase voltage and current are maintained for the generator by controlling the exciter field current. In addition, the negative current feedback circuit between the exciter field circuit and the gain and compensation circuit serves to minimize transients during the application or removal of loads from the generator.

DETAILED DESCRIPTION OF THE INVENTION

Figure 1:
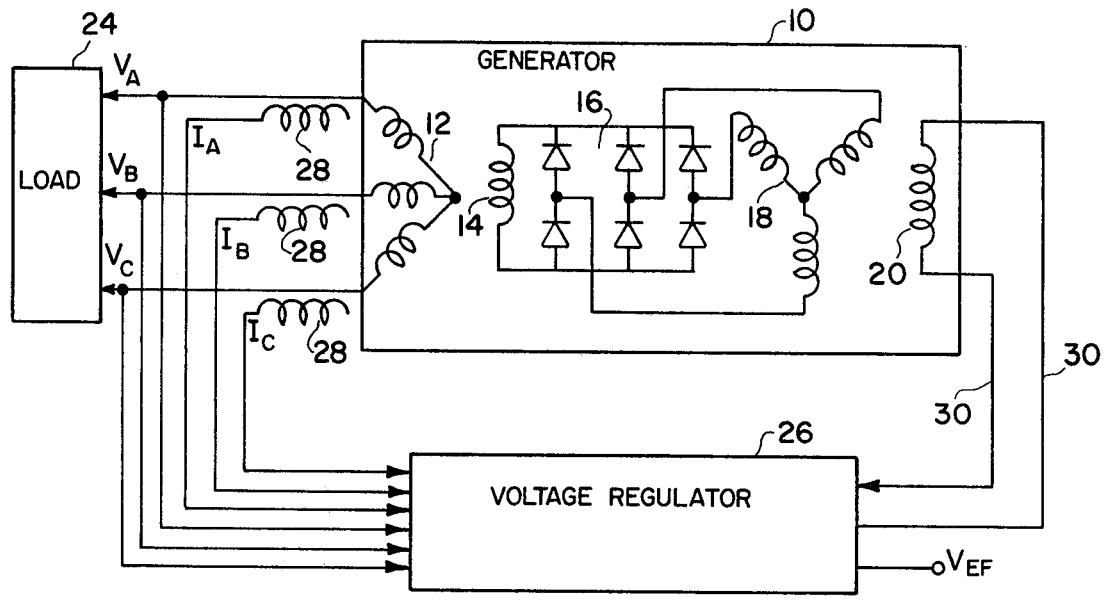
FIG. 1 is a block diagram showing a three-phase generator connected to a load and a voltage regulator.

A typical generator system, that is suitable for use in aircraft, is illustrated in the block diagram of FIG. 1. A three-phase generator 10, as shown in FIG. 1, would normally be of synchronous construction for many applications including aircraft power supply generators. As is well understood in the art, a synchronous generator having three-phase output normally includes: three, or a multiple of three, stator armature windings 12; a main field winding 14 located on the rotor; and a rectifier comprised of the diodes 16 which in turn are connected to a group of exciter armature windings 18 also located on the rotor. In addition, the three-phase synchronous generator 10 normally includes an exciter field winding 20. The exciter field 20 is controlled by a voltage regulator 26. The voltage regulator is supplied with power from a voltage source, here indicated by $V_{EF}$, which may be obtained from any D-C voltage source such as a permanent magnet generator attached to the generator 10 rotor shaft.

The stator armature windings 12 will normally be electrically attached to an electrical load 24. The voltages generated in the stator armature winding 12 are represented by $V_A$, $V_B$, and $V_C$.

In order to control the voltage and limit the current output of the generator 10 an electronic voltage regulator, indicated by box 26, is included in the system of FIG. 1. The voltage regulator 26 responds to the voltages $V_A$, $V_B$, and $V_C$, along with inputs $I_A$, $I_B$, and $I_C$ that represent the current output of the generator 10. As is well-known in the art, current in the output lines from the generator 10 can be measured by means of current transformers such as those shown at 28 of FIG. 2. The voltage regulator 26 serves to control the voltage and limit the current output of the generator 10 by regulating the amount of current in the exciter field winding 20. Signals for accomplishing this regulation are transmitted from the voltage regulator 26 to the exciter field circuit 22 by means of the line 30.

Among the functions of the voltage regulator 26 is the control of the generator voltage output, $V_A$, $V_B$, and $V_C$ within specified limits for specified loads. For example, in a generator having an output with the nominal value of 115 volts from line to neutral, it is considered highly desirable in many applications to keep the output voltage within plus or minus one volt when operating at rated capacity. By the same token, it is considered desirable to keep the output voltage within plus or minus one and one-half volts when operating at a hundred and fifty per cent of rated capacity and two hundred per cent of rated capacity respectively. In addition, these operating characteristics should be achieved within specified time limits after the application or removal of the electrical load 24 from the generator. For example, in aircraft applications it is considered desirable to have the generator output voltage within the desired limits within approximately .02 seconds of the application of a load. Another function of the voltage regulator 26 is to limit the current output of any phase to a predetermined maximum. For instance, the rated per phase output current $I_A$, $I_B$, and $I_C$ should not exceed approximately 2.0 times the rated per phase current output when the generator 10 is operating at normal voltage output and similarly, should not exceed 3.2 times the rated per phase current output when the voltage output of the generator is very low. In order to achieve these operating characteristics and provide transient response, the voltage regulator 26 has been developed.

Figure 2:
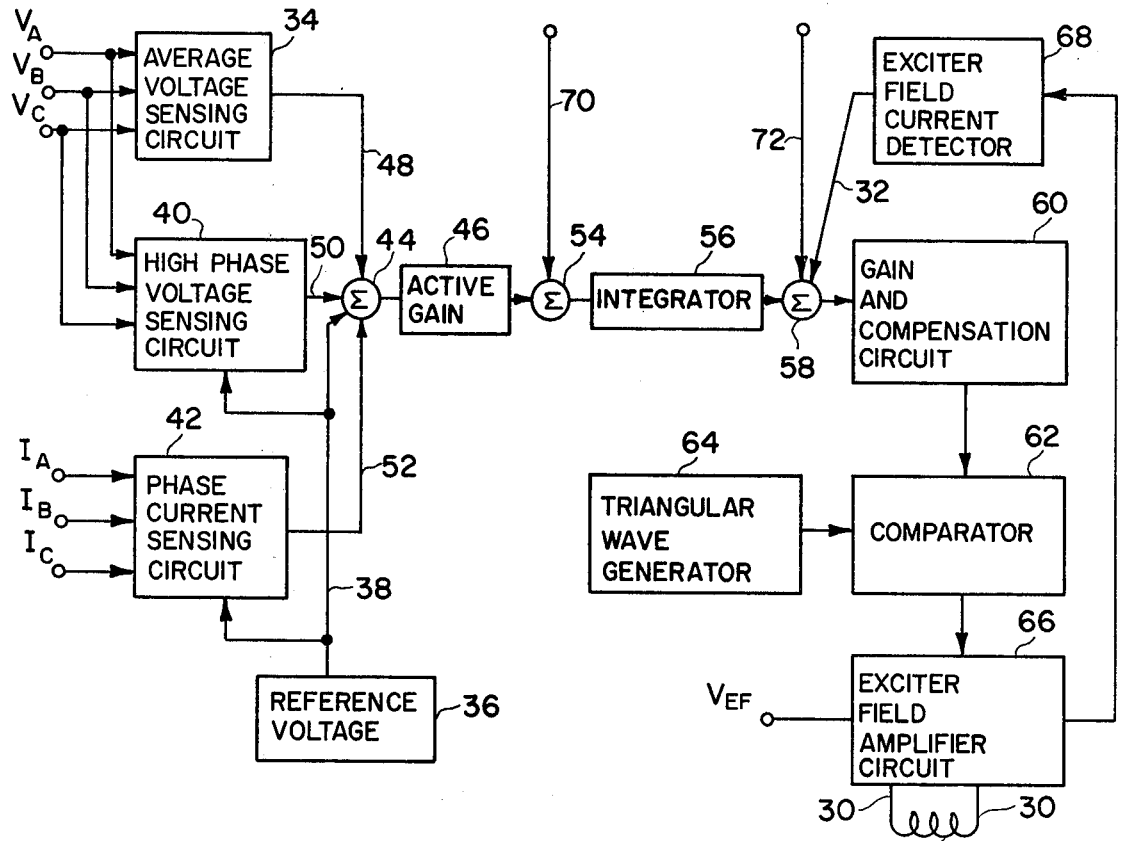
FIG. 2 is a block diagram of the voltage regulator.

A functional block diagram of the voltage regulator 26 is provided in FIG. 2. An average voltage sensing circuit 34 responds to the inputs $V_A$, $V_B$, and $V_C$ by generating a current that is proportional to the average voltage output of the three phase of the generator 10. A reference current is generated in the average voltage sensing circuit 34 which is representative of the desired or nominal average voltage output of all three phases of the generator. This reference current is made possible by means of circuitry that responds to a reference voltage provided by a reference voltage source 36 over line 38.

The voltage regulator 26 also measures the voltage of the highest phase of the generator output voltage by means of a high phase voltage sensing circuit 40. The high phase voltage sensing circuit responds to the generator output voltages $V_A$, $V_B$, and $V_C$ by generating a current that represents the voltage of the highest phase voltage which in turn is compared to a reference current provided by the reference voltage source 36. Similarly, the highest phase output current is measured by a phase current sensing circuit 42 which responds to the input $I_A$, $I_B$, and $I_C$. The current representing the highest phase current is compared in the phase current sensing circuit 42 to a reference current representing the nominal value of the highest phase current as provided by the reference voltage source 36.

Signals indicating that the average voltage output of the generator exceeds the nominal value or that the high phase voltage or high phase current output of the generator exceeds predetermined limits are transmitted to the summing junction 44 of the active gain circuit 46 by means of the lines 48, 50, and 52 respectively. The active gain circuit 46 provides an error signal, or voltage, that represents the deviation of the generator output from the desired or nominal values. This error voltage generated by the active gain circuit 46 is input to the summing junction 54 and thence to an integrator circuit 56. The integrating circuit 56 serves to integrate the error voltage over time, resulting in the application to the summing junction 58 of a voltage that represents the error signal integrated over time. A gain and compensation circuit 60 receives the signal from the summing junction 58 and provides the desired gain and compensating elements for the integrated error signal. Responding to the output of the gain and compensation circuit 60 is a comparator circuit 62 which generates a pulsewidth modulated waveform wherein the pulsewidth represents the integral of the error in the generator output. The integrated error signal, as modified by the gain and compensation circuit 60, is received at one input of the comparator circuit 62 and a triangular wave generator 64 provides to the other input of the comparator 62. By comparing the integrated error signal with the triangular wave generated by the generator 64, the comparator produces the pulsewidth modulated waveform which is utilized as input to an exciter field amplifier circuit 66. The exciter field amplifier circuit 66 responds to the pulsewidth modulated signal from the comparator 62 and causes an electronic switching element, such as a current switching transistor, to permit current from the voltage source $V_{EF}$ to flow through the exciter field 20. A negative, exciter field current feedback loop is provided by an exciter field current detector 68 which is connected between the exciter field amplifier 66 and the summing junction 58 by means of the line 32. In addition, reactive load division capability with other generator systems is facilitated by means of the lines 70 and 72 which provide inputs to the summing junctions 54 and 58 respectively, thereby providing for alterations in the voltage output of the generator 10 in order to equalize the reactive load on the various generators.

Figure 3:
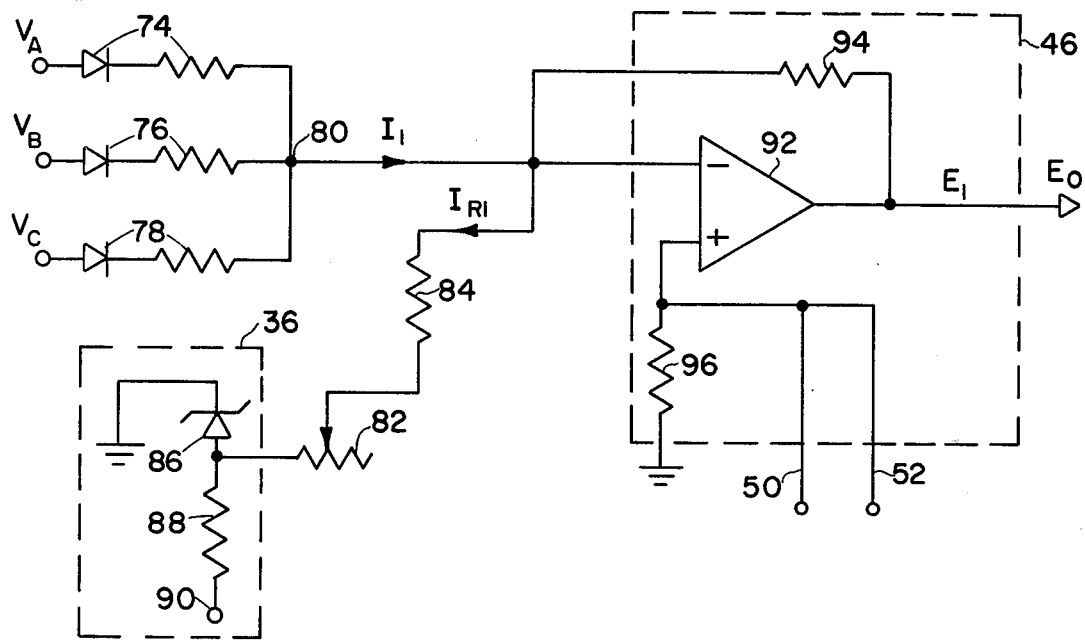
FIG. 3 is a schematic diagram of an average voltage sensing circuit.

The preferred embodiment of the invention will be set forth with a discussion of circuits for implementing the various functions indicated by the boxes in FIG. 1. For example, the average voltage sensing circuit 34 of FIG. 2 is represented by a portion of the schematic shown in FIG. 3. Three parallel diode-resistor combinations 74, 76, and 78 serve to generate currents that are proportional to the phase voltage outputs $V_A$, $V_B$, and $V_C$ of the generator 10. The three currents produced by the diode-resistor combinations 74, 76, and 78 are summed at point 80 into a current $I_1$ which represents the average voltage output of the generator 10. The reference voltage source 36 provides, in combination with a variable resistor 82 and resistance 84, a reference current $I_{R1}$ that represents the nominal or desired value of the average generator voltage output. The reference voltage source as illustrated in FIG. 3 includes a zener diode 86 and a resistor 88 that are connected between ground and a negative voltage source connected to the terminal 90. The zener diode 86 provides a stable negative voltage reference. Connected to the output of the average voltage sensing circuit 34 through the summing junction 44 is the active gain circuit 46. The primary circuit element in the active gain circuit 46 is a differential operational amplifier 92. When the average voltage output of the generator 10 deviates from the nominal value and the values of the currents $I_1$ and $I_{R1}$ are thus unequal, current will flow through a feedback resistor 94 of the operational amplifier 92 connected to the negative terminal of the operational amplifier 92 thereby causing the operational amplifier 92 to generate a voltage $E_1$ at its output terminal which represents the magnitude of the average generator output voltage error. The positive terminal of the operational amplifier 92 is connected to ground through a resistor 96. As a result, the operational amplifier 92 will generate the voltage signal $E_1$ which represents the deviation from the nominal value of the average voltage output of the generator 10. It should be noted at this point, that since the voltage waveforms of the generator output voltages $V_A$, $V_B$, and $V_C$ are averaged over the half-cycle, the circuit is substantially less sensitive to generator waveform changes than peak sensing circuits. This provides excellent steady state accuracy.

Figure 4:
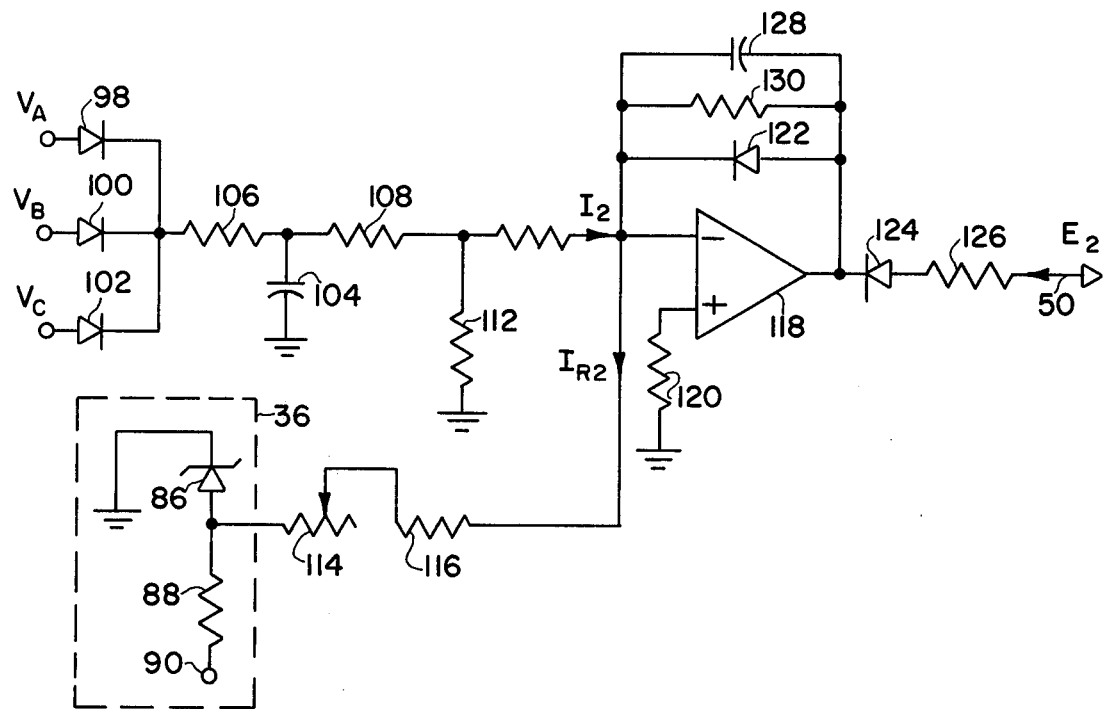
FIG. 4 is a schematic diagram of a high phase voltage sensing and limit circuit.

A schematic of a circuit for implementing the high phase voltage sensing circuit 40 shown in FIG. 2 is provided in FIG. 4. The generator output voltage waveforms are rectified by the diodes 98, 100 and 102 and operate to charge a capacitor 104 through a resistor 106 to a value representing the peak voltage output of the highest phase voltage. A resistive network composed of resistors 108, 110 and 112 cooperate with the capacitor 104 to create the current $I_2$ that represents the highest phase voltage. A reference current $I_{R2}$, produced by the reference voltage source 36 in combination with an adjustable resistor 114, is summed with the current $I_2$ at the summing point or the negative terminal of an operational amplifier 118. The positive terminal of the operational amplifier 114 is adjusted so that the reference current $I_{R2}$ will be equal to $I_2$ when the high phase voltage is a specified value. For example, this value might be 120 VRMS when the nominal value of the voltage output of two phases is zero VRMS due to a fault. Included in a feedback circuit connected baetween the output of the operational amplifier 118 and the negative input terminal is a diode 122. Diode 122 serves to clamp the output voltage of the operational amplifier 118 to zero when the current $I_2$ is less than the reference current $I_{R2}$. When the current $I_2$ exceeds $I_{R2}$, indicating that an individual phase voltage has exceeded the maximum desired value, the output voltage $E_2$ of the operational amplifier 118 will be driven negative. A negative value of $E_2$ will cause current to flow through a terminal or summing junction of the operational amplifier 92 of the active gain circuit 46 shown in FIG. 3. A negative value of $E_2$ will result in the relative potential of the positive terminal of amplifier 92 being reduced, thus producing a reduced positive or negative value of $E_1$. Therefore, it may be appreciated that a value of one of the phase voltages which exceeds the reference value will cause the output voltage of the active gain circuit 46 to decrease in amount proportional to the excessive phase voltage. It should be noted at this point that since the high phase voltage error signal is summed into the voltage regulator before the integrator circuit 56, the regulator 26 will tend to operate with zero error in the steady state. The circuit illustrated in FIG. 4 is also provided with a capacitor 128 and a resistor 130 in the feedback circuit of the operational amplifier 118 which have the effect of a low pass filter, thereby reducing the effects of ripple voltages on the error voltage $E_1$.

Operation of the phase current sensing circuit 42 is similar in operation to the high phase voltage sensing circuit 40. In the phase current circuit 42, illustrated in the schematic of FIG. 5, inputs are received at the diodes 132, 134, and 136 which represent the generator output currents $I_A$, $I_B$, and $I_C$. A capacitor 138 charges through a resistor 140 to a value which represents the peak of the positive half-wave voltage representing generator output current. A resistor 142 cooperates with the capacitor 138 to produce a current $I_3$ which in turn represents the peak phase current. As with the circuit in FIG. 4, the reference voltage source 36 cooperates with a variable resistor 144 and a resistor 146 to produce a reference current $I_{R3}$ which represents a peak allowable phase current. For example, this peak allowable current could be selected to approximately 2.1 times the rated phase current at the rated generator voltage output. The currents $I_3$ and $I_{R3}$ are summed together at the negative terminal of an operational amplifier 148. The positive terminal of the operational amplifier 148 is connected to ground by means of the resistor 150. A diode 152 is connected between the output and the negative terminal of the operational amplifier 148 in order to clamp the output of the operational amplifier when $I_3$ is less than $I_{R3}$. A resistor 154 and a capacitor 156 are also connected in the feedback network of the operational amplifier 148 so as to provide a low pass filter to reduce the effects of voltage ripple on the error signal. As in the circuit of FIG. 4, when $I_3$ exceeds $I_{R3}$, indicating that the peak current has exceeded desirable levels, the voltage output $E_3$ of the operational amplifier 148 will go negative, causing current to flow through a diode 158 and a resistor 160 of line 52. This will again cause the error voltage $E_1$ of operational amplifier 92 to become less positive or go negative as a function of phase current deviation. Thus, the phase current sensing circuit will cause the voltage regulator to effectively limit the maximum generator phase current, depending upon the generator output voltage, and therefore, the maximum shaft power required by the generator for symmetrical and unsymmetrical faults.

Figure 5:
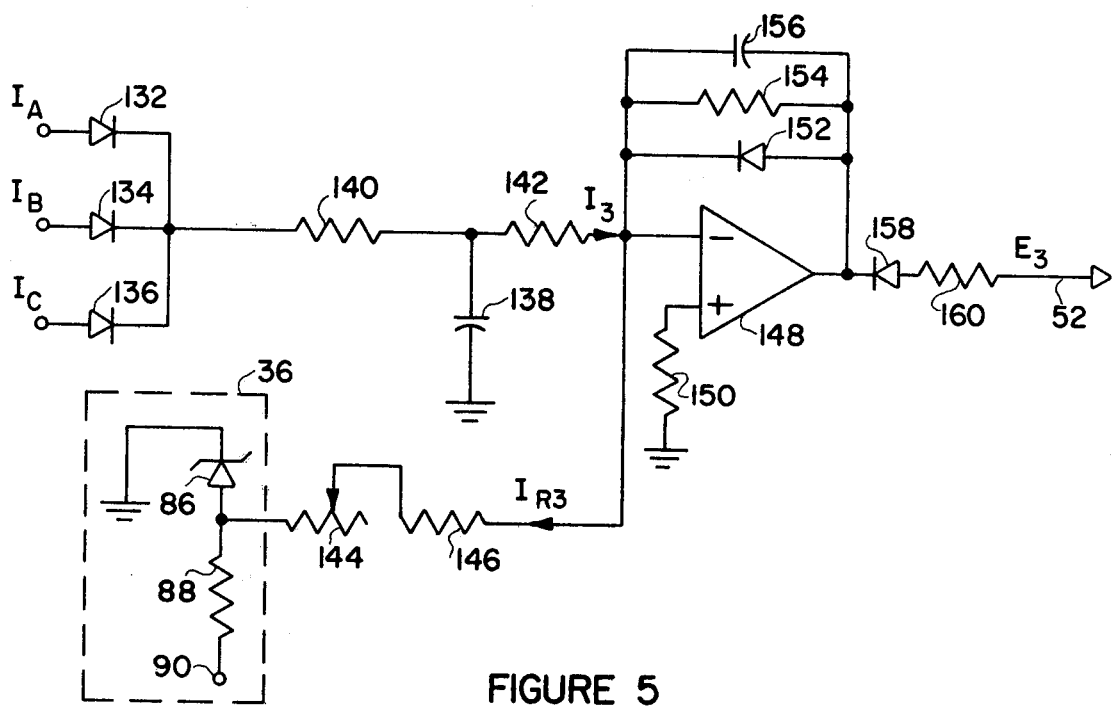
FIG. 5 is a schematic diagram of a phase current sensing and limit circuit.
Figure 6:
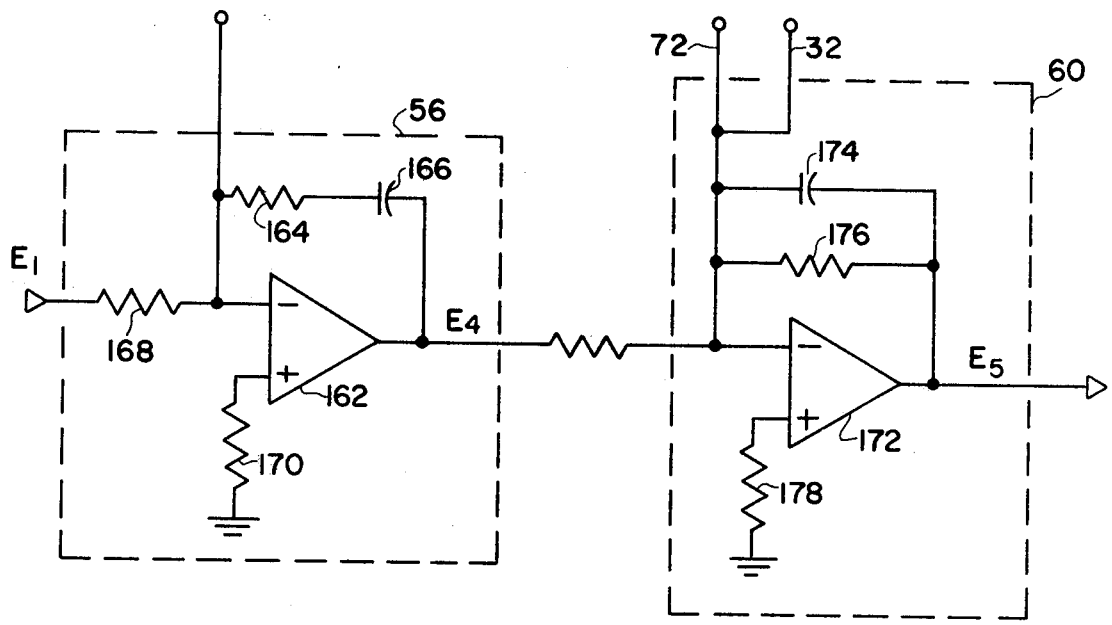
FIG. 6 is a schematic diagram of an integrator circuit and a gain and compensation circuit.

In summarizing the operation of the active gain circuit 46, it is apparent from the foregoing discussion of the circuits in FIGS. 3, 4, and 5 that an above-average voltage output, a high phase voltage output or a phase current which exceeds nominal or desirable values will cause the output of operational amplifier 92 to generate a negative voltage $E_1$. Connected to the output of the active gain circuit 46 is the integrator circuit 56 which is presented in schematic form in FIG. 6. The primary element of the integrator circuit 56 is a differential amplifier 162 having a feedback network composed of the resistor 164 and the capacitor 166 that serves to integrate the error signal $E_1$ received through a resistor 168. The positive terminal of the operational amplifier 162 is connected to ground through a resistor 170. The reactive load division line 70 is connected to the negative terminal of the operational amplifier 162 along with the feedback network, thereby providing the summing junction 54 of FIG. 2. The values of the resistors 168 and 164 and the capacitor 166 can be selected so as to provide the desired time constant by which the error signal $E_1$ is integrated and the value of the capacitor 166 and resistor 164 provide the time constant of the lead signal. In normal operation a positive error voltage $E_1$ will cause the output voltage $E_4$ of the integrator to ramp in a negative direction, and by the same token, when the error voltage $E_1$ is negative, the output voltage $E_4$ will ramp in a positive direction. For zero steady state error, the error voltage $E_1$ must be zero. The integrated error signal $E_4$ is then applied to the gain and compensation circuit 60. The central element in the gain and compensation circuit 60 of FIG. 6 is an operational amplifier 172. The summing junction 58 of FIG. 2 is formed by the connection to the negative terminal of the operational amplifier 172 by the line 72 which is a reactive load division input and the line 32 which is the negative feedback circuit for the exciter current. The feedback network for the operational amplifier 172 is composed of the capacitor 174 and the resistor 176 which serve to regulate the gain of the amplifier 172 and to provide a low pass filter characteristic. Resistor 178 serves to connect the positive terminal of the operational amplifier 172 to ground. Operationally, the combination of the integrator circuit 56 and the gain and compensation circuit 60 provide lead and lag compensation to the system and a specified gain to the input signal $E_4$.

Figure 7:
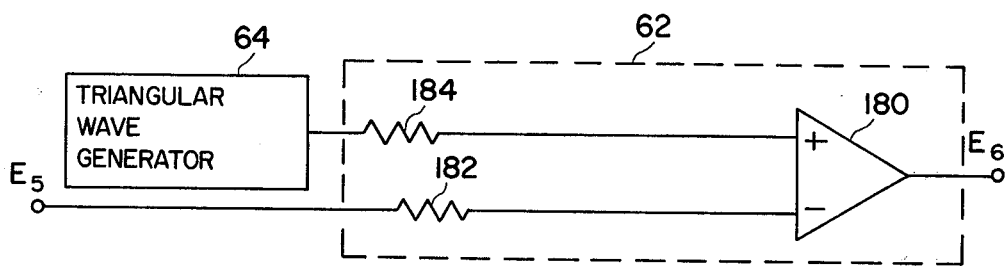
FIG. 7 is a schematic diagram of a comparator circuit.
Figure 8:
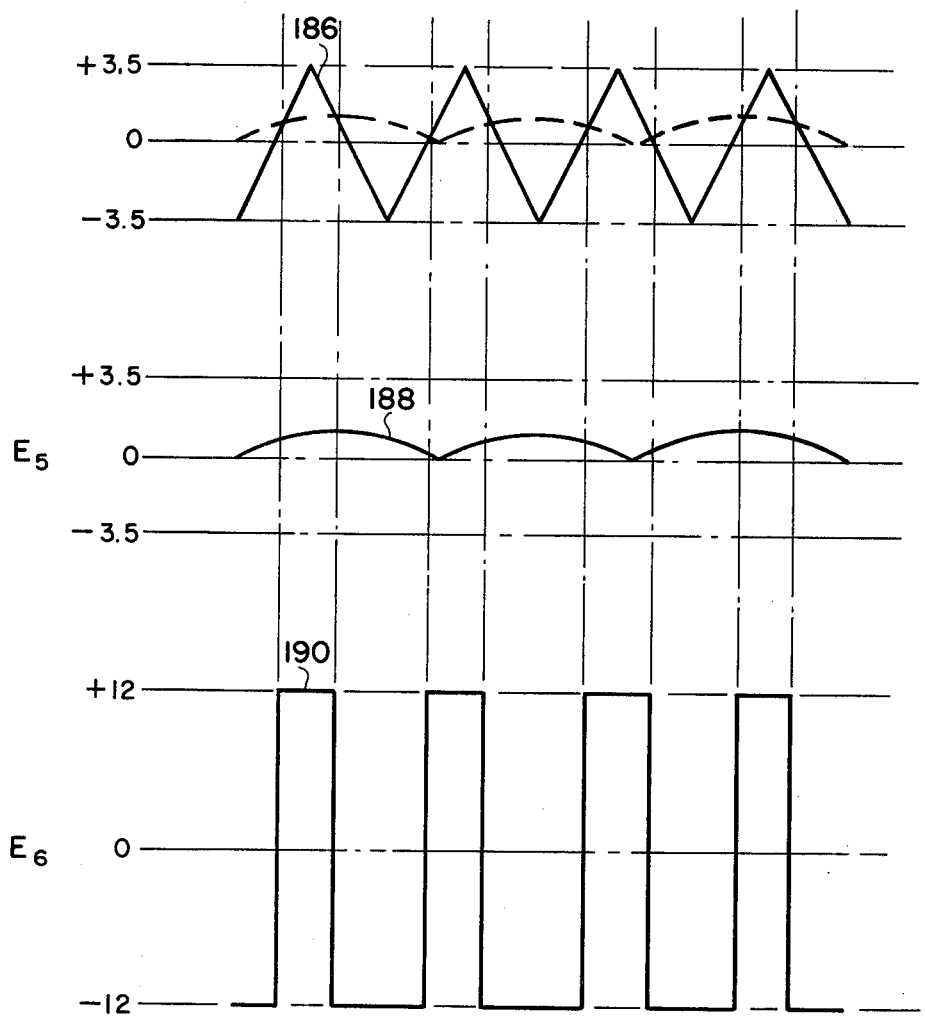
FIG. 8 is a signal chart illustrating the operation of the comparator circuit of FIG. 6.

In FIG. 7 a schematic of the comparator circuit 62 is provided. In the comparator circuit of FIG. 7 an operational amplifier 180 receives the output $E_5$ from the circuit 62 through a resistor 182 at its negative terminal. Output from the triangular wave generator 64 is received through a resistor 184 at the positive terminal of the amplifier 180. Operation of the comparator 62 is illustrated in the signal chart of FIG. 8. The output of the triangular wave generator 64 is represented by a triangular waveform 186 in the upper portion of FIG. 8. A representative output $E_5$ of the gain and compensation circuit 60 is represented by the waveform 188 in the middle of FIG. 8. As can be seen from FIG. 8, when the triangular waveform 186 has a voltage greater than the signal $E_5$, the output, represented by a waveform 190 at the lower part of FIG. 8, is produced at the output $E_6$ of the amplifier 180. The output $E_6$ of the comparator 62 will be a pulsewidth modulated wave wherein the width of the pulses represents the variation of the generator output from nominal or allowable values. In normal operation, when the error signal $E_5$ increases or ramps upwardly, the positive pulsewidths will decrease, and similarly, when the error signal $E_5$ decreases, the positive pulsewidths will increase.

Figure 9:
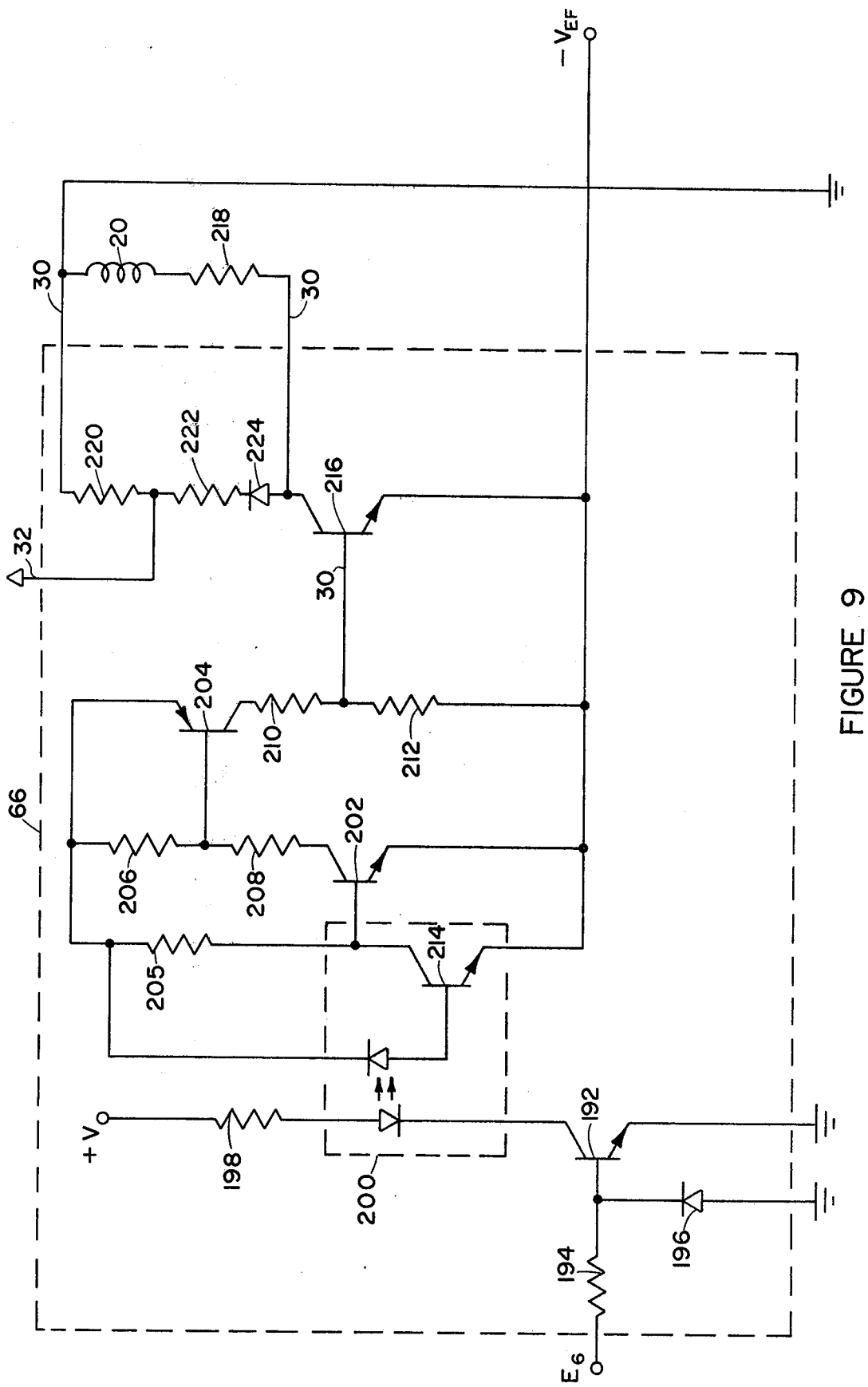
FIG. 9 is a schematic diagram of the output amplifier circuit and the exciter field circuit.

In FIG. 9 of the drawings, a schematic diagram of the exciter field amplifier circuit 66 and a schematic diagram of the exciter field 20 are presented. In the exciter field amplifier 66 the pulsewidth modulated signal from the comparator 62 drives a transistor 192 through a resistor 194 and a diode 196. Current from a voltage source through a resistor 198, as controlled by the transistor 192, drives an optical coupler represented generally within the dashed lines 200. The optical coupler 200 serves to isolate the exciter field amplifier circuit 66 from the rest of the voltage regulator, thereby making the choice of convenient voltages and grounds possible. The low voltage current switching transistor network composed of the transistors 202 and 204, along with resistors 205, 206, 208, 210, and 212, responds to a transistor 214 in the optical coupler 200 to control, by means of line 30, the final current switching transistor 216. In the preferred embodiment a relatively high negative voltage $V_{EF}$, for example on the order of $-105$ volts, is applied to the exciter field 20 and the exciter field amplifier circuit 66. In normal operation, when the current switching transistor 216 is turned on, current will flow from the ground through the exciter field winding 20 wherein the winding's 20 resistance is represented by a resistor 218 to the negative voltage source $V_{EF}$. Applying current to the exciter field winding 20 will, of course, cause the generator 10 to output voltage. The exciter field circuit 20 also provides an alternate current path composed of the resistors 220 and 222 along with the diode 224 so that when the current switching transistor 216 is switched off, unacceptable high voltages created by the natural inductance of the exciter field winding will not be created. The diode 224 prevents current flow through the alternate path when the current switching transistor 216 is in a conducting state. Normally, when the transistor 192 of the exciter field amplifier circuit 66 responds to positive pulses from the pulsewidth modulated signal $E_6$ by switching on, the transistor 214 in the optical coupler will also switch on. When transistor 216 is in a conductive state, transistor 202 will be switched off as will transistor 204. The effect of having transistor 204 in a non-conductive state is to switch off the current switching transistor 216, thereby removing the voltage $V_{EF}$ from the exciter field 20. The net effect of the circuitry provided in the exciter field amplifier 66 is to make the average current through the exciter field winding 20 approximately proportional to the pulsewidth modulated waveform $E_6$. Since the optical coupler 200 has the effect of inverting the pulsewidth modulated signal $E_6$, the smaller the pulsewidth, the greater the average current will be through the exciter field winding 20. Thus, for example, if too high a phase voltage or phase current is detected, the error signal $E_5$ of the gain and compensation circuit 60 will cause the comparator 62 to generate a pulsewidth modulated signal $E_6$ having pulses of a greater width, thereby resulting in an effective reduction in the average current through the exciter filed tending to reduce the current and/or voltage output of the generator. In the exciter field amplifier circuit 66 of FIG. 9, the resistor 220 serves to provide a voltage representative of the exciter field current and, therefore, is equivalent to the exciter field current detector 68 of FIG. 2.

We claim:

1. An electronic voltage regulator for generators having exiter field circuits, comprising:
    means for sensing the voltage output of the generator;
    means, responsive to said voltage sensing means, for comparing the voltage output to a reference value;
    means for sensing the current output of the generator;
    means, responsive to said current sensing means, for comparing the current output to a reference value;
    means, responsive to said voltage and said current comparing means, for generating an error signal;
    means, responsive to said error signal, for integrating said error signal over time; and
    means, responsive to said integrated error signal, for controlling the exciter field circuit, thereby regulating the voltage and current output of the generator.

2. The voltage regulator of claim 1 wherein said voltage sensing means includes:
    a circuit for generating a current representing the generator voltage output; and said voltage comparing means includes:
    a circuit for generating a current representing said voltage reference value; and
    a circuit for comparing said current representing the generator voltage and said current representing said current reference values.

3. The voltage regulator of claim 2 wherein said error signal generating means includes an operational amplifier responsive to said currents representing the generator voltage and reference value and effective to generate a voltage representing the deviation of the generator voltage from said voltage reference value.

4. The voltage regulator of claim 3 wherein said current sensing means includes:
    a circuit for generating a current representing the generator current output; and said current comparing means includes:
    a circuit for generating a current representing said current reference value; and
    a circuit for comparing said current representing the generator output current and said reference current.

5. The voltage regulator of claim 4 wherein said comparing circuit of said current sensing means includes an operational amplifier, operatively connected to said operational amplifier in said error signal generating means, effective to vary said error signal as a function of the deviation of generator current from said generator current reference values.

6. The voltage regulator of claim 5 additionally including a circuit, responsive to said integrated error signal, for generating a pulsewidth modulated signal representing said integrated error signal.

7. The voltage regulator of claim 6 wherein said exciter controlling means includes at least one current switching transistor, responsive to said pulsewidth modulated signal, for controlling the application of current to the generator exciter field.

8. The voltage regulator of claim 7 wherein said exciter controlling means additionally includes an optical coupler inserted in the circuit between said pulsewidth modulated signal generator and said current switching transistor.

9. The voltage regulator of claim 8 additionally including an exciter field current detector circuit connected to said integrating means for providing a negative current feedback circuit.

10. An electronic voltage regulator for generators controlled by means of an exciter field current, comprising:
    an average voltage sensing circuit connected to the output of the generator;
    a high phase voltage sensing circuit connected to the output of the generator;
    a high phase current sensing circuit connected to the output of the generator;
    an error signal circuit operatively connected to said average voltage sensing, high phase voltage sensing and high phase current circuits, and effective to generate an error signal when the generator's average output voltage varies from a predetermined value or when the high phase voltage or high phase current exceeds predetermined limits;
    an integrating circuit operatively connected to said error signal circuit effective to integrate said error signal over time; and
    an exciter field amplifier circuit, operatively connected to said integrating circuit effective to control the generator field current in response to said integrated error signal.

11. The voltage regulator of claim 10 additionally including an exciter field current detector circuit, operatively connected to the exciter field, effective to provide a negative current feedback circuit.

12. The voltage regulator of claim 11 additionally including a pulsewidth modulated signal generating circuit, operatively connected between said integrating circuit and said exciter field circuit, effective to convert said integrated error signal into a pulsewidth modulated error signal.

13. The voltage regulator of claim 12 wherein said average voltage circuit includes:
    a circuit for generating a current representing the average generator output voltage;
    a circuit for generating a current representing a nominal value of the average generator output voltage; and
    a first operational amplifier, responsive to said currents representing the average generator output voltage and said nominal value of output voltage, effective to generate a voltage signal representing the deviation of the generator's output voltage from said nominal value.

14. The voltage regulator of claim 13 wherein said high phase voltage sensing circuit includes:
    a circuit for generating a current representing the high phase voltage;
    a circuit for generating a current representing a specified high phase voltage; and
    a second operational amplifier, responsive to said current representing the high phase voltage and said specified high phase voltage, effective to generate a voltage signal representing the current by which the high phase voltage exceeds said specified high phase voltage.

15. The voltage regulator of claim 14 wherein said high phase current sensing circuit includes:
   a circuit for generating a current representing the high phase current;
   a circuit for generating a current representing a specified high phase current;
   a third operational amplifier, responsive to said currents representing the high phase current and said specified high phase current, effective to generate a voltage signal representing the amount by which the high phase current exceeds said specified high phase current.

16. The voltage regulator of claim 15 wherein said error signal circuit includes a circuit connecting said first, second and third operational amplifiers, effective to combine the output of said operational amplifiers to generate said error signal.

17. The voltage regulator of claim 16 wherein said exciter field control circuit includes:
   at least one current switching transistor connected between a voltage source and the generator exciter field circuit;
   a circuit, responsive to said pulsewidth modulated error signal, for controlling said current switching transistor.

18. The voltage regulator of claim 17 wherein said pulsewidth generating circuit includes:
   a triangular wave signal generator; and
   an operational amplifier comparator circuit, responsive to said triangular wave generator and to said integrated error signal.

19. The voltage regulator of claim 18 additionally including a zener diode reference voltage source operatively connected to said first, second and third operational amplifier.

20. The voltage regulator of claim 19 additionally including circuit connections to said integrating circuit, for receiving load division error signals from other generators in order to facilitate reactive load division in a multi-generator system.

21. An electronic voltage regulator for generators having exciter field circuits, comprising:
   an average voltage sensing circuit including: a diode-resistor circuit connected to each phase of the generator output; a first operational amplifier connected to said diode-resistor circuits, and an average voltage reference circuit connected to said first operational amplifier effective to cause said first operational amplifier to generate an error signal for predetermined average generator voltage outputs;
   a high phase voltage sensing circuit including: a diode circuit connected to each phase of the generator output, a high phase voltage reference circuit, and a second operational amplifier operatively connected to said diode circuit, said high phase voltage reference circuit and said first operational amplifier for modifying said error signal for predetermined high phase generator voltages;
   a high current sensing circuit including: a diode circuit connected to each phase of the generator output, a high phase current reference circuit, and a third operational amplifier operatively connected to said diode circuit, said high phase current reference circuit and said first operational amplifier for modifying said error signal for predetermined high phase generator currents;
   an integrator circuit operatively connected to said first amplifier for integrating said error signal over time;
   a pulsewidth modulated signal generator operatively connected to said integrator circuit including: a triangular wave generator and an operational amplifier comparison circuit for converting said integrated error signal into a pulsewidth modulated signal;
   an exciter field control circuit operatively connected to said pulsewidth modulated signal generator including at least one current switching transistor, connected between a voltage source and the exciter field circuit, responsive to said pulsewidth modulated error signal; and
   an exciter field current detector circuit operatively connected between the exciter field circuit and said pulsewidth modulated signal generator.

22. The voltage regulator of claim 21 wherein said exciter field control circuit additionally includes an optical coupler operatively connected between said pulsewidth modulated signal generator and said current switching transistor.

23. The voltage regulator of claim 22 additionally including a gain and compensation circuit operatively connected between said integrator circuit and said pulsewidth modulated signal generator.

24. The voltage regulator of claim 23 additionally including a zener reference voltage source operatively connected to said average voltage reference circuit, said high phase voltage reference circuit, and said high phase current reference circuit.

25. The voltage regulator of claim 24 wherein:
   said average voltage reference circuit includes an adjustable resistance operatively connected to said zener voltage source for selectively adjusting the reference signal;
   said high phase voltage reference circuit includes an adjustable resistance operatively connected to said zener reference source for selectively adjusting the reference signal; and
   said high phase current reference circuit includes an adjustable resistance operatively connected to said zener voltage source for selectively adjusting the reference signal.

* * * * *

UNITED STATES PATENT OFFICE
CERTIFICATE OF CORRECTION

Patent No. 4,044,296          Dated  August 23, 1977

Inventor(s)    P. John J. Dhyanchand et al.

It is certified that error appears in the above-identified patent and that said Letters Patent are hereby corrected as shown below:

Column 2, line 21, "ad" should read -- and --.

Column 4, line 14, "phase" should read -- phases --.

Column 6, line 10, "bae-" should read -- be- --.

*Signed and Sealed this*

*Twenty-first* Day of *March 1978*

[SEAL]

Attest:

RUTH C. MASON
*Attesting Officer*

LUTRELLE F. PARKER
*Acting Commissioner of Patents and Trademarks*